(12) United States Patent
Kojori

(10) Patent No.: US 7,308,614 B2
(45) Date of Patent: Dec. 11, 2007

(54) CONTROL SEQUENCING AND PROGNOSTICS HEALTH MONITORING FOR DIGITAL POWER CONVERSION AND LOAD MANAGEMENT

(75) Inventor: Hassan A. Kojori, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 10/412,229

(22) Filed: Apr. 14, 2003

(65) Prior Publication Data

US 2003/0204777 A1     Oct. 30, 2003

Related U.S. Application Data

(60) Provisional application No. 60/376,572, filed on Apr. 30, 2002.

(51) Int. Cl.
*G06F 11/00* (2006.01)
*G06F 7/00* (2006.01)

(52) U.S. Cl. .............. 714/47; 714/22; 701/35

(58) Field of Classification Search .......... 714/14, 714/22, 47; 713/340
See application file for complete search history.

(56) References Cited

U.S. PATENT DOCUMENTS

| | | |
|---|---|---|
| 4,728,806 A | 3/1988 | Baker et al. |
| 5,008,801 A | 4/1991 | Glennon |
| 5,281,905 A | 1/1994 | Dhyanchand et al. |
| 5,317,498 A | 5/1994 | Dhyandchand et al. |
| 5,521,787 A | 5/1996 | Baker et al. |
| 5,627,744 A | 5/1997 | Baker et al. |
| 5,764,502 A | 6/1998 | Morgan et al. |
| 5,814,903 A | 9/1998 | Wu |
| 5,912,552 A | 6/1999 | Tateishi |
| 5,939,800 A | 8/1999 | Artinian et al. |
| 5,959,852 A | 9/1999 | Deloy et al. |

(Continued)

FOREIGN PATENT DOCUMENTS

EP      0 352 340 A1     1/1990

(Continued)

OTHER PUBLICATIONS

El-Tamaly et al., "Low Cost PWM Converter for Utility Interface of Variable Speed Wind Turbine Generators," Applied Power Electronics Conference and Exposition, 1999, APEC '99, Fourteenth Annual, Dallas, TX, Mar. 14-18, 1999, Piscataway, NJ, IEEE, Mar. 14, 1999, pp. 889-895.

(Continued)

*Primary Examiner*—Scott Baderman
*Assistant Examiner*—Joshua Lohn
(74) *Attorney, Agent, or Firm*—Birch, Stewart, Kolasch & Birch, LLP

(57) ABSTRACT

An electronics-based system (100) for power conversion and load management provides control sequencing and prognostic health monitoring and diagnostics for fault tolerant operation of the system. The system (100) includes a prognostic health monitoring and diagnostic unit (30) for identifying present out-of-range conditions, overload conditions, and trending violations, for components of the system and a decision making unit (20), which controls transitions between a plurality of operating modes to ensure fail-safe operation without unnecessary tripping, cold-starts or system resets upon the occurrence of certain fault conditions.

26 Claims, 10 Drawing Sheets

U.S. PATENT DOCUMENTS

| | | | |
|---|---|---|---|
| 5,977,645 A | 11/1999 | Glennon | |
| 6,005,362 A | 12/1999 | Enjeti et al. | |
| 6,023,134 A | 2/2000 | Carl et al. | |
| 6,038,152 A | 3/2000 | Baker | |
| 6,108,221 A | 8/2000 | Takada et al. | |
| 6,122,575 A * | 9/2000 | Schmidt et al. | 701/29 |
| 6,124,646 A | 9/2000 | Artinian et al. | |
| 6,134,127 A | 10/2000 | Kirchberg | |
| 6,157,168 A | 12/2000 | Malik | |
| 6,170,062 B1 * | 1/2001 | Henrie | 713/340 |
| 6,175,163 B1 | 1/2001 | Rinaldi et al. | |
| 6,201,715 B1 | 3/2001 | Huggett et al. | |
| 6,243,277 B1 | 6/2001 | Sun et al. | |
| 6,243,628 B1 * | 6/2001 | Bliley et al. | 701/29 |
| 6,256,977 B1 * | 7/2001 | McGinley et al. | 60/786 |
| 6,297,980 B1 | 10/2001 | Smedley et al. | |
| 6,304,981 B1 * | 10/2001 | Spears et al. | 714/24 |
| 6,326,758 B1 | 12/2001 | Discenzo | |
| 6,330,668 B1 | 12/2001 | Curiger et al. | |
| 6,341,073 B1 | 1/2002 | Lee | |
| 6,366,483 B1 | 4/2002 | Ma et al. | |
| 6,370,050 B1 | 4/2002 | Peng et al. | |
| 6,574,537 B2 * | 6/2003 | Kipersztok et al. | 701/29 |
| 6,691,064 B2 * | 2/2004 | Vroman | 702/183 |
| 6,738,811 B1 * | 5/2004 | Liang | 709/224 |
| 6,832,236 B1 * | 12/2004 | Hamilton et al. | 718/100 |
| 6,845,468 B2 * | 1/2005 | James | 714/25 |
| 6,848,064 B2 * | 1/2005 | Bolz | 714/47 |
| 6,892,317 B1 * | 5/2005 | Sampath et al. | 714/4 |
| 7,031,812 B1 * | 4/2006 | Pettigrew et al. | 701/14 |
| 2002/0118001 A1 | 8/2002 | Duffy et al. | |
| 2003/0045977 A1 * | 3/2003 | Sato et al. | 701/35 |
| 2003/0204759 A1 * | 10/2003 | Singh | 713/320 |
| 2004/0176887 A1 | 9/2004 | Kent et al. | |

FOREIGN PATENT DOCUMENTS

| | | |
|---|---|---|
| EP | 0 455 181 A | 11/1991 |
| EP | 1 039 389 A1 | 9/2000 |

OTHER PUBLICATIONS

P. Eichenberger et al., "Predictive Vector Control of the Stator Voltages for an Induction Machine Drive with Current Source Inverter," Power Electronics Specialists Conference, 1997. PESC '97 Record., 28th Annual IEEE, St. Louis, MO Jun. 22-27, 1997, New YOrk, NY, IEEE, Jun. 22, 1997, pp. 1295-1301.

U. Radel et al., "Network Feeder with Synchronous Generator for Variable Speed Wind Turbines as a Laboratory Model," EPE '97, 7th European Conference on Power Electronics and Applications, Trondheim, Sep. 8-10, 1997, EPE. European Conference on Power Electronics and Applications, Brussels, EPE Association, B, vol. 2, Conf. 7, Sep. 8, 1997, pp. 2735-2738.

G. You et al., "Comparison of Pulse Width Modulation (PWM) Techniques for Advanced Aerospace Load Power Management Applications," Honeywell 2002-01-3183.

* cited by examiner

CONTROL SEQUENCING AND PROGNOSTICS HEALTH MONITORING FOR DIGITAL POWER CONVERSION AND LOAD MANAGEMENT

RELATED APPLICATION

This application claims priority under 35 U.S.C. §119(e) of U.S. Provisional Application 60/376,572 filed on Apr. 30, 2002, the entire contents of which are herein incorporated by reference.

FIELD OF THE INVENTION

The present invention relates to power sequencing, diagnostics and prognostics health monitoring of fault tolerant digital power conversion, distribution and load management systems. In particular, embodiments of the present invention provide modes of command/control and methods of fault tolerant operation for coordinating digital protection functions, diagnostics and health monitoring of such systems based on start-up and continuous tests, comprehensive power sequencing for achieving Soft-start, Soft-stop, ride-through and for responding to power system contingencies such as shoot-through, voltage surge, under-voltage, voltage sag, system imbalance, system under/over-frequency, over-load, critical component junction temperature and thermal management under/over-temperature and wrong phase sequence conditions.

BACKGROUND OF THE INVENTION

There are many components, devices, equipment and systems required to make up an electrical power conversion and distribution system and many such power-electronics based systems have been developed and used in the prior art for numerous different applications, including motor controls. Usually a command is received either manually or automatically and one or more control objectives are achieved, regulated and maintained through sensing related controlled system parameters. Appropriate control decisions are typically made in a closed-loop or feed-forward fashion through a digital or analog controller to control power-electronics based switches such as SCRs, MOSFETs, IGBTs, Intelligent Power Modules, etc. For example, a power electronics based motor controllers typically include the following main subassemblies/functions:

Logic power supply;
Power electronics controller;
Control strategy/algorithm;
Power pass inverter (and rectifier if AC-DC-AC) devices/module;
Signal measurement (current, voltage temp, speed, etc.) and isolation;
Gate driver;
Power interconnect;
Logic interconnect;
Power sequencing, protection coordination and fault tolerance circuitry;
EMI and power quality filters for input and output;
Thermal management;
DC link capacitor;
Motor drive (DC Machine, Induction Machine, PMSM, wound field SM, SRM etc.); Controls I/O; and
Chassis.

Although electrical power conversion and distribution systems have been developed, these power conversion technologies can not presently be effectively used for mission critical "more electric" future applications (e.g., land, sea, air transport) due to the harsh operating environments and conditions resulting in very low Mean Time Between Failure (MTBF) of the main components and very limited integrated protection coordination, diagnostics and monitoring to improve overall system health and reliability.

Much work has been directed toward improving the overall health and reliability of power control systems. In particular, U.S. Pat. No. 6,122,575 discloses a system, method, and computer program to assist a technician in troubleshooting an aircraft auxiliary power unit (APU). A portable computer is capable of downloading the fault data captured in a memory of the electric control unit (ECU). The fault data corresponds to one or more instances of APU failure. The computer is further programmed to compare the fault data to predetermined fault patterns stored in a database. Each record of the database has one of the fault patterns, a corresponding fault indication, and a corresponding service recommendation indication. The computer is further programmed so that when a record in which the fault pattern matches the fault data is found, the corresponding fault indication and service recommendation are retrieved from the database and provided to the technician via the computer's display or other suitable output mechanism.

Although the foregoing system provides enhanced information regarding service recommendations, the analysis is performed offline based only on past faults recorded. Therefore, this system does not provide any forward-looking analysis of potential failures or real time analysis of component health. Further, the system disclosed in U.S. Pat. No. 6,122,575 does not address component level critical devices, but only looks at the system at a subsystem level (e.g., APU). Furthermore, such a prior art health monitoring and diagnostics system does not address low MTBF and poor reliability of power-electronics based systems because the failure modes are not mitigated thoroughly, both at the system level and component level. Such conventional systems are not fault tolerant and due to limited Built-In-Tests (BIT) their proper operation can not be assessed at start-up or continuously monitored during normal or abnormal operation. Furthermore, lack of proper power sequencing, Soft-start, Soft-stop, ride-through, and proper protection against contingencies such as voltage-sag, voltage surge, system imbalance, under/over-frequency, over-load, over-temperature and wrong phase sequence conditions results in very stressful situations which usually degrade or cause total failure of major components of the system. Other limitations of prior art systems include the following:

Limited operation modes—e.g., only RUN and STOP modes available. The system is usually tripped (i.e., the load is disconnected from the power distribution system) under any abnormal condition without specifying the associated failure. As a result, a perceived faulty unit is commonly removed from the field and sent back to the supplier. After detailed testing and debugging in most cases, it is confirmed that the unit is capable of proper operation and consequently labeled as No Fault Found (NFF).

These nuisance trips and NFFs are labor intensive, tedious and not cost effective. User-friendly and efficient debugging of the system problems is not readily possible after a field trip/failure in a timely manner.

Power sequencing (initial turn-on or turn-off of the unit) is stressful and limited operation modes do not provide a mitigation opportunity for all the known system stressful transients or failure modes.

Lack of proper protection coordination, i.e., sequence, priority and timing control among different provisions of system and/or component level protection methods.

Detailed system level field operation or component level limitation data is usually not available at the design time.

All the failure modes or stressful periods of operation at the system or component level cannot be predicted at the time of design.

Stressful periods of operation or their actual cumulative effect cannot be monitored and accounted for in real-time to estimate the remaining time-to-failure.

Corrective maintenance cannot be reliably scheduled to replace degraded components to prevent components/system failure in the field during operation.

A major limitation still remains in relation to overall system reliability, and the fact that conventional diagnostic systems record fault data in formats that do not aid in diagnosing future failures of the monitored components.

SUMMARY OF THE INVENTION

In accordance with the present invention, certain deficiencies in prior systems are overcome by providing a method and apparatus for implementing fault tolerant power control sequencing of power electronics based systems. In particular, some advantageous embodiments described herein include:

An advanced set of operation modes including RUN, STOP/READY, ALARM, FAULT, and STANDBY and clearly defined transition criteria among these operating modes.

Digital bi-directional command/control for proper operation and real-time protection, diagnostics and health monitoring.

Digital protection coordination with non-volatile memory for recording the history of the health monitoring and diagnostics with the capability of remote access for command/control and inspection/intervention.

The recorded system performance and health data can be viewed as an "Actual Digital Black Box", which notifies a local user to take corrective and/or preventive measures in the face of operation problems/failures.

The system performance and health data can also be communicated on-demand and this constitutes a remote "Virtual Digital Black Box" at the system/component level which is readily available in case of a field problem/failure for real-time intervention from a remote location or inspection after a system/component mishap.

System contingencies which include comprehensive Start-up Built-In-Test (S-BIT) and Continuous Built-In-Test (C-BIT) data.

Comprehensive power sequencing to reduce component level degradation by mitigating against stressful periods of operation through proper algorithms for Soft-start, Soft-stop, ride-through and for responding to other power system contingencies such as shoot-through, voltage surge, voltage sag, over-load, over-temperature and wrong phase sequence conditions.

Prognostics health monitoring which allows the use of past and present system and/or component level data to predict future performance as corrective or preventive measures.

Data for critical components of the system can be incorporated and adjustment to the validity of such data can be incorporated in real-time during operation. Consequently, reliability data related to the critical components can be monitored and updated in real-time during operation.

By monitoring stressful periods of operation, cumulative effects of such stresses are monitored and assessed and a measure of the remaining useful life of each of the critical components is estimated in real time based upon the reliability data, present operating data and historical operating data of the critical components.

BRIEF DESCRIPTION OF THE DRAWINGS

A more complete understanding of the present invention and its advantages will become apparent from the following description taken in conjunction with the accompanying drawings, wherein.

DETAILED DESCRIPTION OF THE PREFERRED EMBODIMENTS

Aspects of the invention are more specifically set forth in the accompanying description with reference to the appended Figures.

Figure 1:
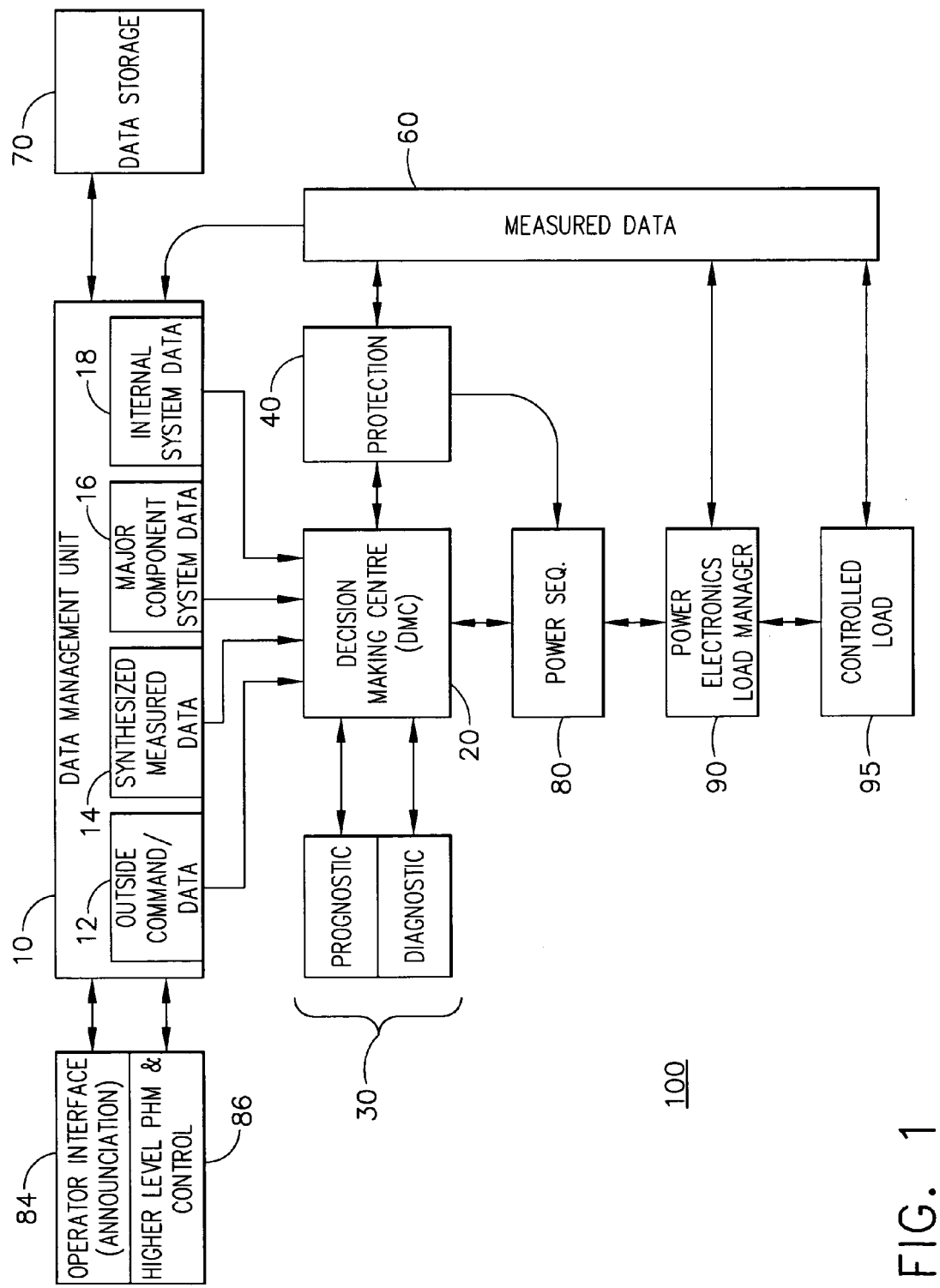
FIG. 1 is a block diagram of a control sequence and a prognostic health monitoring system for digital power conversion and load management according to an embodiment of the present invention.

FIG. 1 illustrates a block diagram of a control sequencing and prognostic health monitoring system for digital power conversion and load management according to an embodiment of the present invention. The system 100 illustrated in FIG. 1 includes the following components: a data management unit (DMU) 10; a decision making center (DMC) 20; a prognostics health monitoring and diagnostics (PHMD) unit 30; a protection unit 40; a data measuring unit 60; a data storage unit 70; a power sequencing control unit 80; an operator interface 84; a higher level PHM and control unit 86; a power electronics load manager (PELM) 90; and a controlled load 95. The controlled load 95 may be any of numerous types of loads, including an active motor load such as an induction motor, synchronous machine or a Brushless DC motor or other passive load. The PELM 90 may be any suitable power-electronics based power conversion and delivery system.

Operation of and functional interaction between the components illustrated in FIG. 1 will become apparent from the following discussion. Although the various components of FIG. 1 are illustrated as discrete elements, such an illustration is for ease of explanation and it should be recognized that certain operations of the various components may be performed in the same physical device, e.g., in one or more digital signal processing (DSP), ASIC, FPGA, . . . , units or digital/analog controllers, or distributed among multiple devices. Generally, the system illustrated in FIG. 1 provides power to a load(s) while performing and coordinating various protection, diagnostic, and health monitoring functions of the fault tolerant power system. The system of FIG. 1 controls transition between a plurality of operating modes, which together mitigate fault conditions and improve the ability to safely and efficiently operate despite the occurrence of power system contingencies such as shoot-through, voltage surge, under-voltage, voltage sag, system imbalance, system under/over-frequency, over-load, critical component junction temperature and thermal management under/over-temperature and wrong phase sequence conditions. At least five distinct modes of operation are achieved and integrated with the overall system for prognostic health monitoring and diagnostics according to embodiments of the present invention, including: STOP/READY mode; STANDBY mode; RUN mode; FAULT mode; and ALARM mode, which will each be described below, to achieve a fault tolerant power electronics based system.

The system 100 illustrated in FIG. 1 is suitable for control sequencing and prognostics health monitoring of a synchronous and bi-directional variable frequency power conversion system, such as that described in the co-pending application filed on Apr. 1, 2003, and titled "SYNCHRONOUS AND BI-DIRECTIONAL VARIABLE FREQUENCY POWER CONVERSION SYSTEMS," which is herein incorporated by reference in its entirety. In other words, PELM 90 may be implemented as including the power-conversion system described in this co-pending application. It should be recognized, however, that applicability of the present invention is not limited to such a power conversion system and instead generally extends to a variety of power electronics-based systems. In the following description, an exemplary embodiment is described with reference to characteristics of a power conversion system that utilizes active switching components for power rectification/inversion in a multi-phase AC input/output power environment, such as those components described in the above-referenced co-pending application, which rely on active switching for AC-DC; DC-AC; or AC-DC-AC power conversion. Thus, the exemplary embodiment presented below refers to certain control signals of such a system, including CB_ON (which is at a HIGH level when a circuit breaker between the power conversion system and the load is turned on), SS_ON (which is at a HIGH level when a Soft-start operation is completed), and PWM-Enable (which is HIGH when the gating pattern which controls the active switches of the power electronics are operating to rectify/invert input power in accordance with a pulse width modulated switch gating signal). Such a description is not intended to limit the scope of the present application to such a power conversion system/environment.

The DMU 10 includes the following sub-components: an outside command/data unit 12; a synthesized measured data unit 14; a major component system data unit 16; and an internal system data unit 18. The outside command/data unit 12 receives commands and data from, and outputs data such as critical system parameters, system status indicators, alarm indicators, and fault indicators, to the operator interface 84 and/or a higher level PHM and control device 86.

As described in greater detail below, the system 100 illustrated in FIG. 1 performs diagnostics and health monitoring of power electronics components based on both instantaneous measurement values as well as measurement value trends (including e.g., rms system voltages and currents, rates of temperature change, etc.). Accordingly, the decision making center 20 relies in part on synthesized/refined measurement values. The synthesized measured data unit 14 synthesizes measurement values and stores the results of such synthesis to enable trend analysis. As known by those skilled in the art, manufacturers of electrical components (e.g., IGBTs, SCRs, MOSFETs, capacitors, filters, etc.) typically provide data regarding the operating envelopes, MTBF, allowable temperature, etc., of the devices and limits for usage beyond the operating envelope. Further, manufacturers, industry groups, and technical groups may provide information regarding the expected reduction to usable component life based upon certain operating conditions. This data may be provided both for individual components as well as for subsystems. The major component system data unit 16 stores such information, which, as described below, may be utilized by the DMC 20 to perform and enhance prognostics, diagnostics, and protection of components. Furthermore, diagnostics and health monitoring in accordance with embodiments of the present invention can identify conditions and characteristics of system components as a function of various operating condition/modes so as to update/supplement the data stored in the major component system data 16.

Still further, the prognostic, diagnostic, and protection functions performed under control of the DMC 20 generate data relating to out-of-range conditions, trend violations, etc., which serves as historical data that can subsequently be accessed to estimate future life/reliability of electronic components/subsystems. For example, such historical data may indicate magnitude, frequency, and duration of an out-of-range condition for a critical component (e.g., IGBT) and may be accessed to estimate the future life/reliability of the component. According to the present invention, such generated data is stored in the internal system data unit 18 of the DMU 10. The internal system data unit 18 is preferably non-volatile memory for recording the history of diagnostics and health monitoring with the capability of remote access for command/control and inspection/intervention. The data storage unit 70 is provided to store measurement values (e.g., raw measurement values from the data measuring unit 60 to be subsequently refined/synthesized) as well as historical data, from recorded field or other system/component operation situations, beyond the storage capacity of the internal system data unit 18. Further aspects of the elements of system 100 illustrated in FIG. 1 will become apparent by the following description of the operation and functional interaction between the system components with reference to the flow diagrams of FIGS. 2-8 and the operator interface illustrations of FIGS. 9A-9B.

Figure 2:
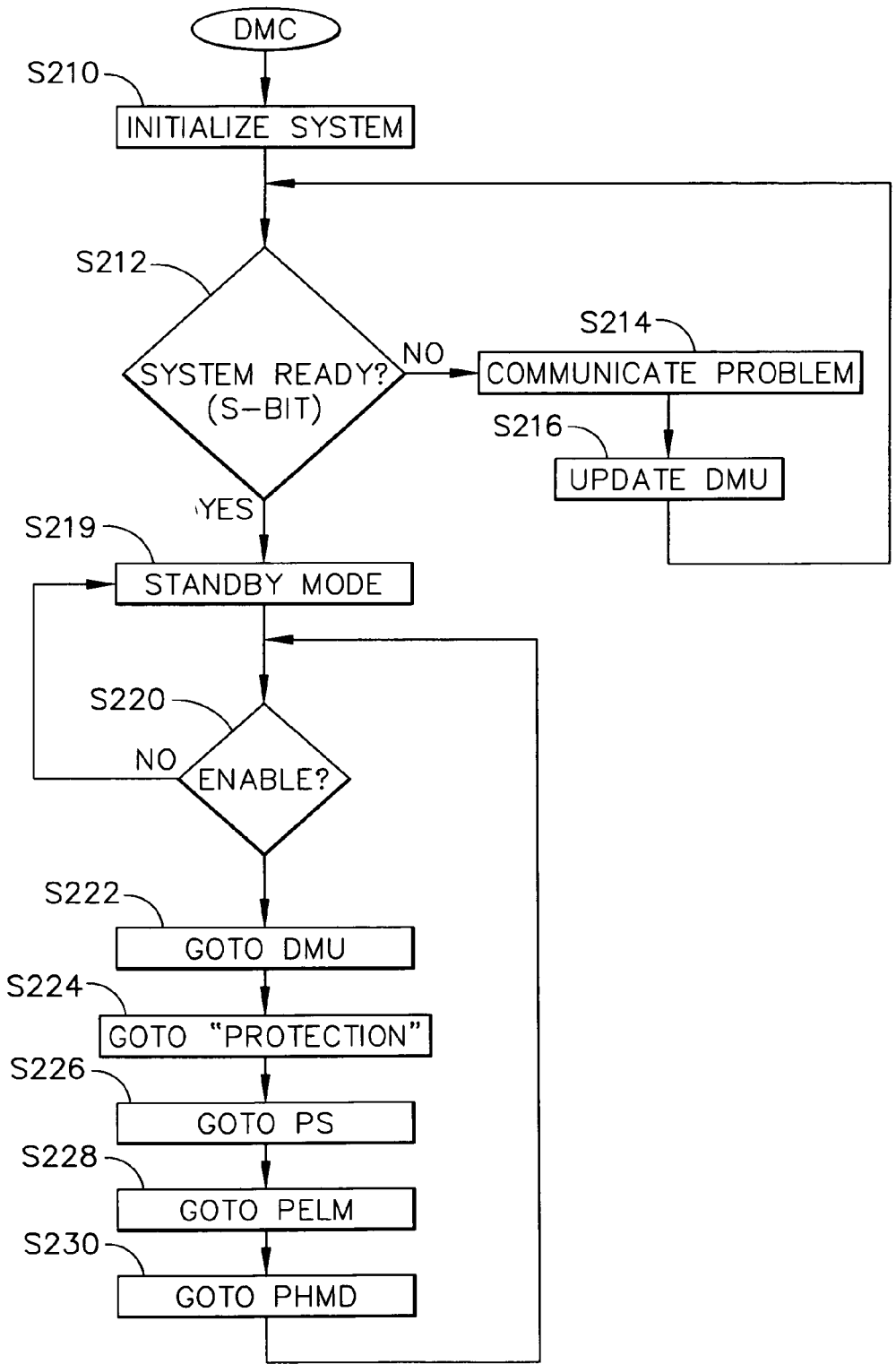
FIG. 2 is a flow diagram illustrating operations performed by a decision making center to control power sequencing, diagnostics, and prognostics health monitoring of power electronics according to an embodiment of the present invention.

FIG. 2 is a flow diagram illustrating operations performed/initiated by the DMC 20, which functions as the central control/master unit for power sequencing, diagnostics, and health monitoring according to an embodiment of the present invention. First, the DMC 20 initializes the system 100 (S210) and executes a start-up built-in test (S-BIT), which generally determines whether the system is ready to follow commands and control, for example by confirming proper operation of internal/external communication (S212). In accordance with this initial start-up test, the DMC 20 performs certain test routines to confirm the readiness of the digital controller and power pass system to carry out commands/control and the overall status of the system. More specifically, the DMC 20 determines whether the logic power supply (e.g., 28 VDC) is present and confirms proper operation of internal/external communication. During this initialization and start-up testing, the system 100 is operating in the "STOP/READY" mode.

If the DMC 20 determines that the system is not ready, e.g., based on a lack of logic power supply or lack of internal/external communication, this problem is communicated, if possible, to the operator interface 84 via the outside command/data unit 12 of the DMU 10 (S214). Furthermore, data indicating the particular problem is sent to the internal system data unit 18 of the DMU 10 (S216). In other words, depending on the condition identified, a FAULT or ALARM flag may be set. Thus, the system may transition from the STOP/READY mode to a FAULT or ALARM mode. Next, the system 100 returns to S212.

When the DMC 20 determines at S212 that the system is ready, the DMC 20 transitions to STANDBY mode (S219) and next determines whether an enable signal has been received from the operator interface 84 or the higher level PHM and control unit 86 (S220). If the state of the enable signal is LOW, operation of the DMC 20 returns to step S219 (i.e., operation stays in the STANDBY mode). During STANDBY, a continuous built-in test (C-BIT) is used to continuously update and communicate the health of the system 100. Thus, the system may transition from STANDBY mode to a FAULT mode or an ALARM mode, to update appropriate flags and communicate to the operator interface 84, and back to the STANDBY mode. If the enable signal is HIGH, the DMC 20 initiates a series of control/power sequencing, diagnostics, protection and prognostics health monitoring sub-routines. More specifically, the DMC 20 initiates a DMU sub-routine (S222), a protection sub-routine (S224), a power sequencing sub-routine (S226), a power electronics load management sub-routine (S228), and a prognostics health monitoring and diagnostics sub-routine (S230). These individual sub-routines will next be described with reference to FIGS. 3-7.

Figure 3:
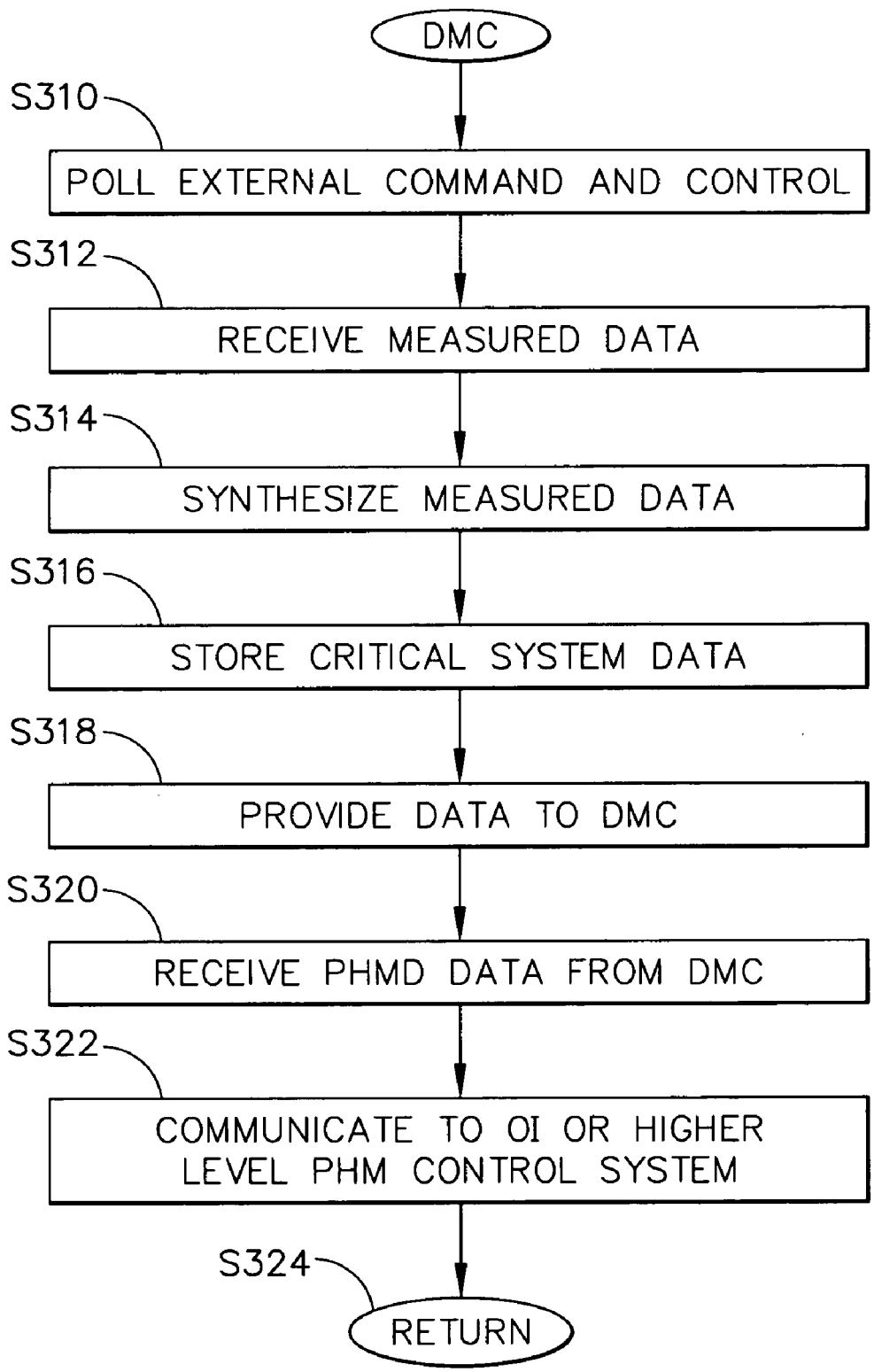
FIG. 3 is a flow diagram illustrating operations performed by the data management unit of the system illustrated in FIG. 1 according to an embodiment of the present invention.

In accordance with the DMU sub-routine illustrated in FIG. 3, the DMU 10 polls the external operator interface 84 and the higher level PHM and control unit 86 via the outside command/data unit 12 (S310). For example, the DMU 10 may receive stop/start command from the operator interface 84. Furthermore, the DMU 10 receives measured data, e.g., current, voltage, temperature, etc., directly from the data measuring unit 60 and/or from the data storage unit 70 (S312). The synthesized measured data unit 14 of the DMU 10 synthesizes/refines measurement values (S314) and the DMU 10 stores critical system data in the internal system data unit 18 (S316). By way of example, the synthesized measured data unit 14 may calculate rms system voltage and current, under/over frequency, power overload, power factor, rate of rise and fall of critical system parameters (di/dt or dv/dt, etc.), Total Harmonic Distortion (THD), individual harmonic components of the system voltages and currents, degree of system unbalance and variation in the systems symmetrical components (positive, negative and zero sequence components), system efficiency and its variation over-time for the same operational modes, degree of meeting system regulation objectives, etc. Furthermore, the DMU 10 provides the DMC 20 with synthesized and critical system data for PHMD, examples of which are discussed herein (S318). This data may include major component system data (e.g., component MTBF, operating envelopes, etc.) accessed from the major system component unit if the DMU 10 also receives PHMD data from the DMC 20 so that such data may be stored in the internal system data unit 18 as historical data (S320) and communicated to the operator interface 84 and/or the higher level PHM and control unit 86 (S322). This completes the DMU sub-routine, and operation flow returns to S224 of FIG. 2 (S324).

Figure 4:
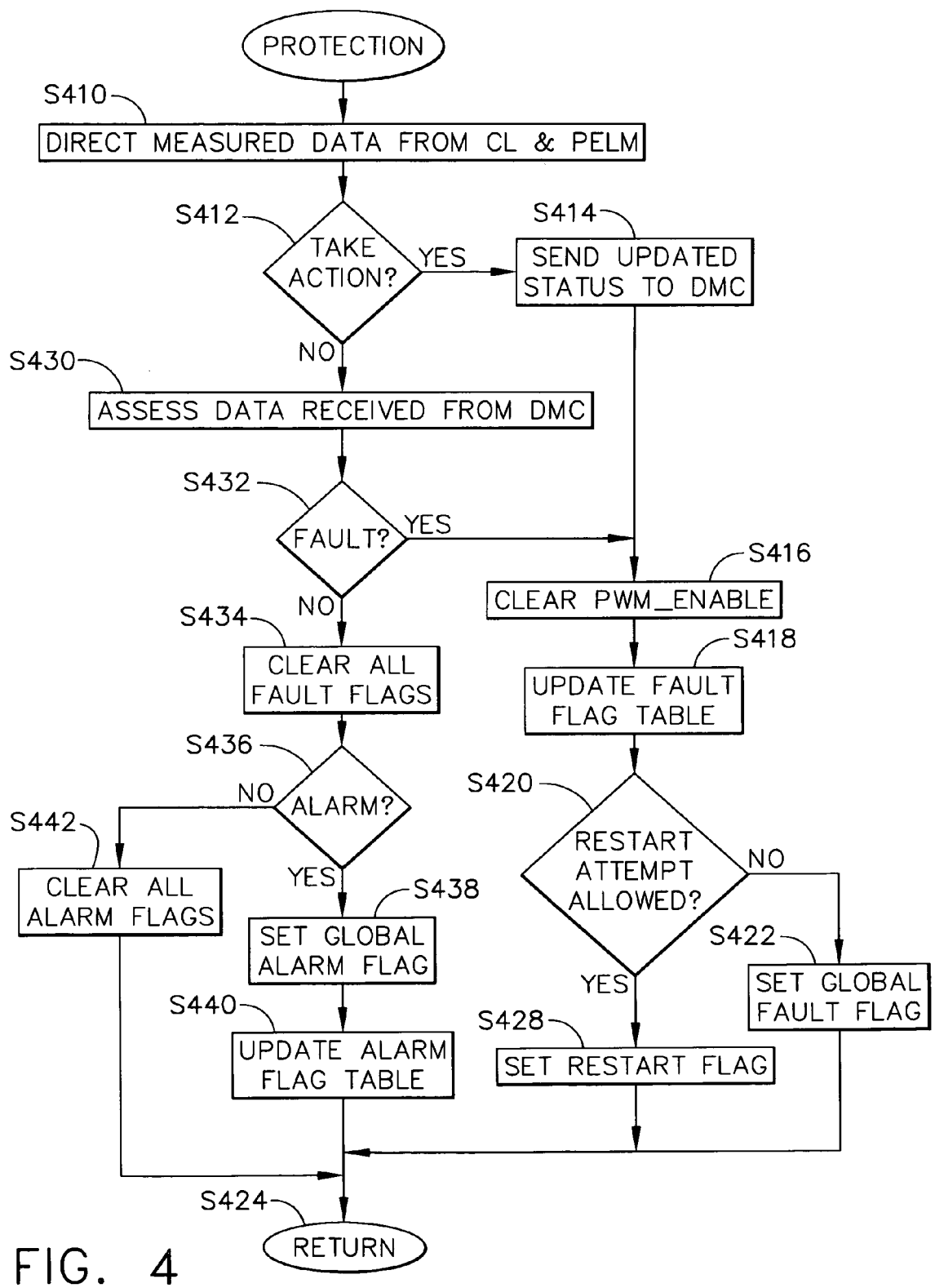
FIG. 4 is a flow diagram illustrating operations performed by the protection unit of the system illustrated in FIG. 1 according to an embodiment of the present application.

FIG. 4 is a flow diagram illustrating operations performed by the protection unit 40 (i.e., the protection unit sub-routine S224 in FIG. 2). In accordance with the system of the present invention, out-of-range conditions may be based on absolute component/system measurement values, i.e., based only on the present component/system data measurements obtained by the data measuring unit 60, or may be based on trends seen and/or analysis/synthesis of the past and present data measured in combination with previously recorded data from suppliers. Certain out-of-range conditions (e.g., a ground fault conditions) require immediate action, such that the protection unit 40 selectively performs "hard-wired" functions independent of synthesized measurement data or commands from the DMC 20. Accordingly, the protection unit 40 receives measurements values directly from the controlled load 95 and the PELM 90 (S410). Based on these direct data measurements, the protection unit 40 determines whether some sort of corrective/invasive action is necessary (S412). For example, the protection unit 40 may react to an instantaneous voltage surge, an instantaneous over-current or shoot-through, critical component over-temperature, heat sink temperature, a ground fault current, logic power supply under/over-voltage, speed, vibration, etc. Upon determining that action should be taken, the protection unit 40 sends updated status information to the DMC 20 (S414). In case of ALARM, no action is taken, but the system status and out-of-range conditions are communicated to the DMC 20 and the user interface 84 or higher level PHM and control unit 86. In case of FAULT, the PWM_ENABLE signal is cleared (S416), and a fault flag table maintained by the DMC 20 is updated (S418). Next, the DMC 20 determines whether to attempt a RESTART based on predetermined recorded scenarios (S420). Fault conditions are sometimes temporary or momentary in nature. Examples of such temporary/momentary faults include voltage surge, power interruption, excessive individual or total harmonic distortion, excessive heat sink temperature, etc. Thus, when it is determined at S420 that a RESTART attempt is allowable, a RESTART scheme will result in the system being started again to determine if the fault condition is removed (this may be repeated several times, e.g., 3-5 times). If the fault condition is not removed during the allowed RESTART attempt, the system will go back to the FAULT mode and wait a short time-out (e.g., 100 ms-1 s) and try again until the system recovers or the maximum number of allowable RESTART attempts is exceeded. If it is determined at S420 that a restart attempt is not allowed, a global fault flag is set (S422) and system RESTART can not be re-attempted. If RESTART is allowed, a restart flag is set (S428).

With reference again to FIG. 4, when the determination at S412 is that no action is required based on direct measured data from the controlled load 95 and the PELM 90, the protection unit 40 accesses additional information from the DMC 20 (S430) and determines whether a fault condition exists (S432). For example, the DMC 20 may indicate a FAULT condition based on synthesized measurement data. If yes, the operation of the protection unit 40 moves to S416 (clear PWM_ENABLE). If the determination at S432 is that there is no fault, the protection unit 40 clears all fault flags (S434) and determines whether an ALARM condition has occurred (S436). An alarm condition occurs when one or more conditions are detected which are close to boundaries of safe operation. Upon detecting such alarm conditions, the user interface 84 and/or higher level PHM and control unit 86 are cautioned/notified and correction actions/interventions may be taken to maintain the health of the system by closely monitoring and predicting alarm conditions, thus preventing escalation of the problem to a more severe one which may result in a global fault or jeopardize the overall system/unit safety. If the protection unit 40 determines that an ALARM condition exists, a global alarm flag is set (S438) and an alarm flag table is updated (S440). If, however, no alarm condition exists, all alarm flags are cleared (S442). This completes the protection sub-routine, and operation flow returns to S226 of FIG. 2 (S424).

Figure 5:
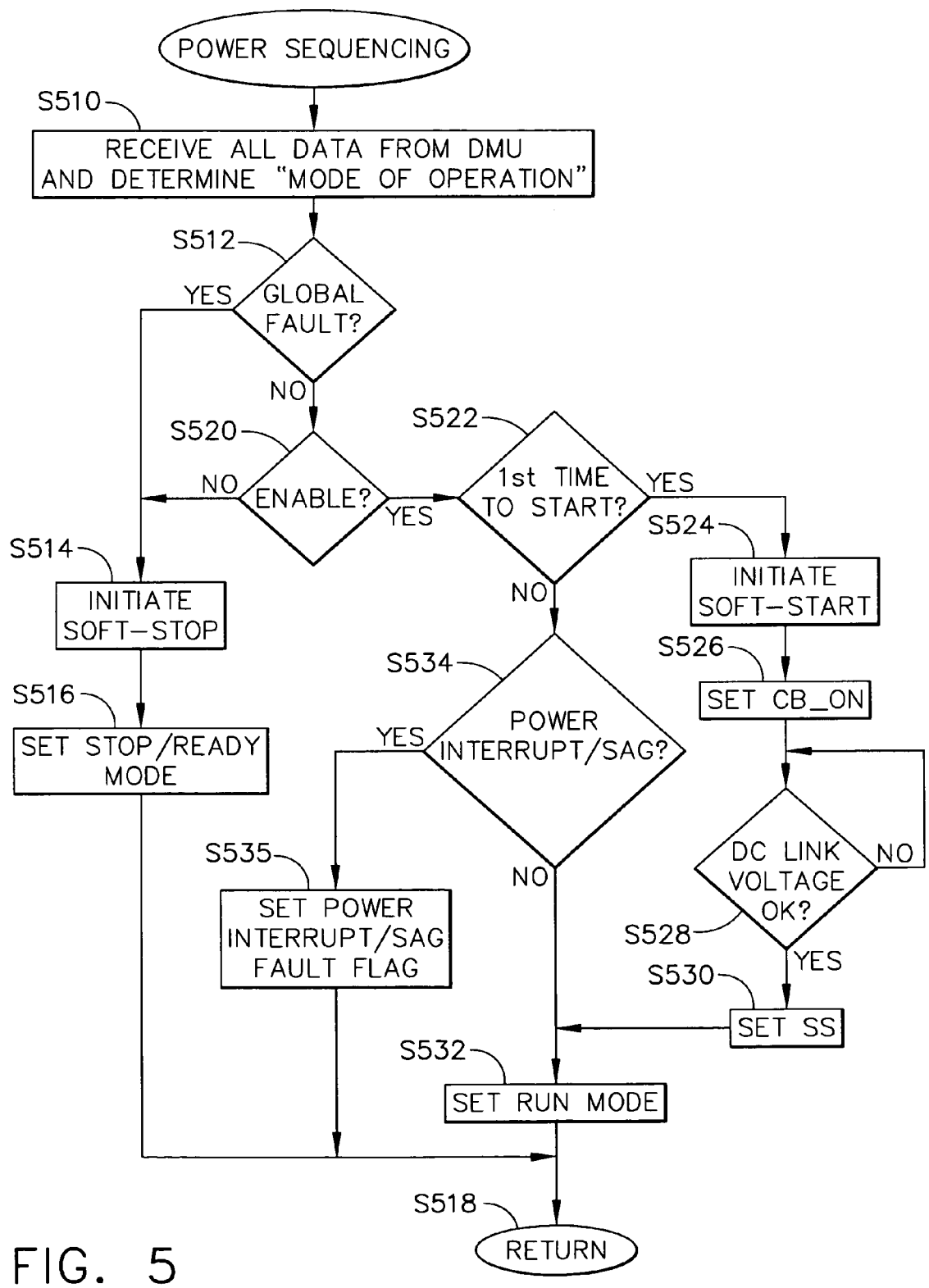
FIG. 5 is a flow diagram illustrating operations performed by the power sequencing unit of the system illustrated in FIG. 1 in accordance with an embodiment of the present application.

FIG. 5 is a flow diagram illustrating operations of the power sequencing unit 80 to control power sequencing for the associated power system (i.e., the power sequencing sub-routine S226 in FIG. 2). Initially, the power sequencing unit 80 receives relevant data from the DMU 10 via the DMC 20 to determine the mode of operation (S510). Next, the power sequencing unit 80 determines whether the global fault flag is set (S512) and, if yes, initiates a Soft-stop operation (S514). When the STOP command is received from either the system operator, the protection circuitry or the PHM system, the power conversion and distribution system has to be properly shut down in a safe manner. This requires proper ramp-down on the critical system electrical inputs/outputs and then disabling the switch gating patterns (by setting the PWM-ENABLE control signal LOW). After completing the Soft-stop operation, the power sequencing unit 80 transitions to a STOP/READY mode (S512). After setting the STOP/READY mode at S516, the operation of the power sequencing sub-routine is complete.

If the power sequencing unit 80 determines at S512 that no global fault condition exists, it determines the state of the ENABLE signal from the operator interface 84 or the higher PHM control unit 86 (S520). If the ENABLE signal is LOW, the power sequencing unit 80 initiates a Soft-stop operation of S514. The main purpose of a Soft-stop is to prevent electrical transients which may be imposed on major system components as a result of interrupting operation and quickly transitioning to a STOP/READY mode. Some physical quantities such as speed of an electromechanical system, voltage across a capacitor, current through an inductor, etc. can not be reduced to zero without proper Soft-stop mitigation methods. For example, in the case of a controlled electromechanical system, a dynamic brake is required to dissipate the stored energy in a machine before it can be brought to a stop quickly. A Soft-stop technique in accordance with an exemplary implementation of the present invention would allow the use of a dynamic brake or allow bi-directional flow of energy to the DC link and back to the AC system, as applicable without the need for a dynamic brake.

If the ENABLE signal is HIGH, the power sequencing unit 80 determines whether an initial start operation is necessary (S522). If no, the power sequencing unit 80 determines whether a power interrupt or power sag condition exists (S534). If yes, the power sequencing unit 80 sets a power-interrupt/sag fault flag (S535) and the power sequencing sub-routine is complete (S518). If the determination at S534 is that there is no power-interrupt condition, the power sequencing unit 80 sets/maintains RUN mode (S532). If the determination at S522 is that an initial start sequence is needed, the power sequencing unit 80 initiates a Soft-start operation (S524).

Initial in-rush currents in inductive loads or charging capacitor banks cause very large transient currents and voltage excursions which over-stress semiconductors and may damage other electrical system circuit components such as DC link caps and EMI filter components. To prevent such stressful situations, a time-interval called "Soft-start" is incorporated at the beginning of operation, i.e., at the initiation of the RUN mode. Soft-start may be considered an initial sub-mode of the RUN mode. Two exemplary types of Soft-start interval are briefly described for AC-DC and DC-AC power conversion equipment below:

1) After receiving the ENABLE signal, if there is no FAULT condition present, a Soft-start is initiated by "Power Sequencing" routine by asserting CB_ON HIGH (S526) and closing an input power switch (i.e., a DC contactor for DC power and a circuit breaker for AC power (not shown) between the source of power and the power conversion equipment). After the DC link capacitor voltage is charged to a preset value (S528), the SS_ON signal is asserted HIGH and this allows the Soft-start switch to be closed (S530). Then the PWM_ENABLE is asserted HIGH (i.e., the "RUN" mode is set) and the gating signals of the power conversion equipment are enabled and system starts its normal RUN mode operation.

2) Another type of Soft-start can be envisioned for ramping of the output voltages of a DC-AC power conversion equipment to a loads in a synchronous fashion to prevent start-up electrical system transients.

An exemplary Soft-start technique is described in co-pending application Ser. No. 10/075,880, filed Feb. 13, 2002 and titled "Soft-Start of DC Link Capacitors for Power Electronics and Drive Systems," which is incorporated herein by reference.

After the RUN mode is set at S532, operation of the power sequencing sub-routine is complete and operation returns to S228 of FIG. 2 (S518).

Figure 6:
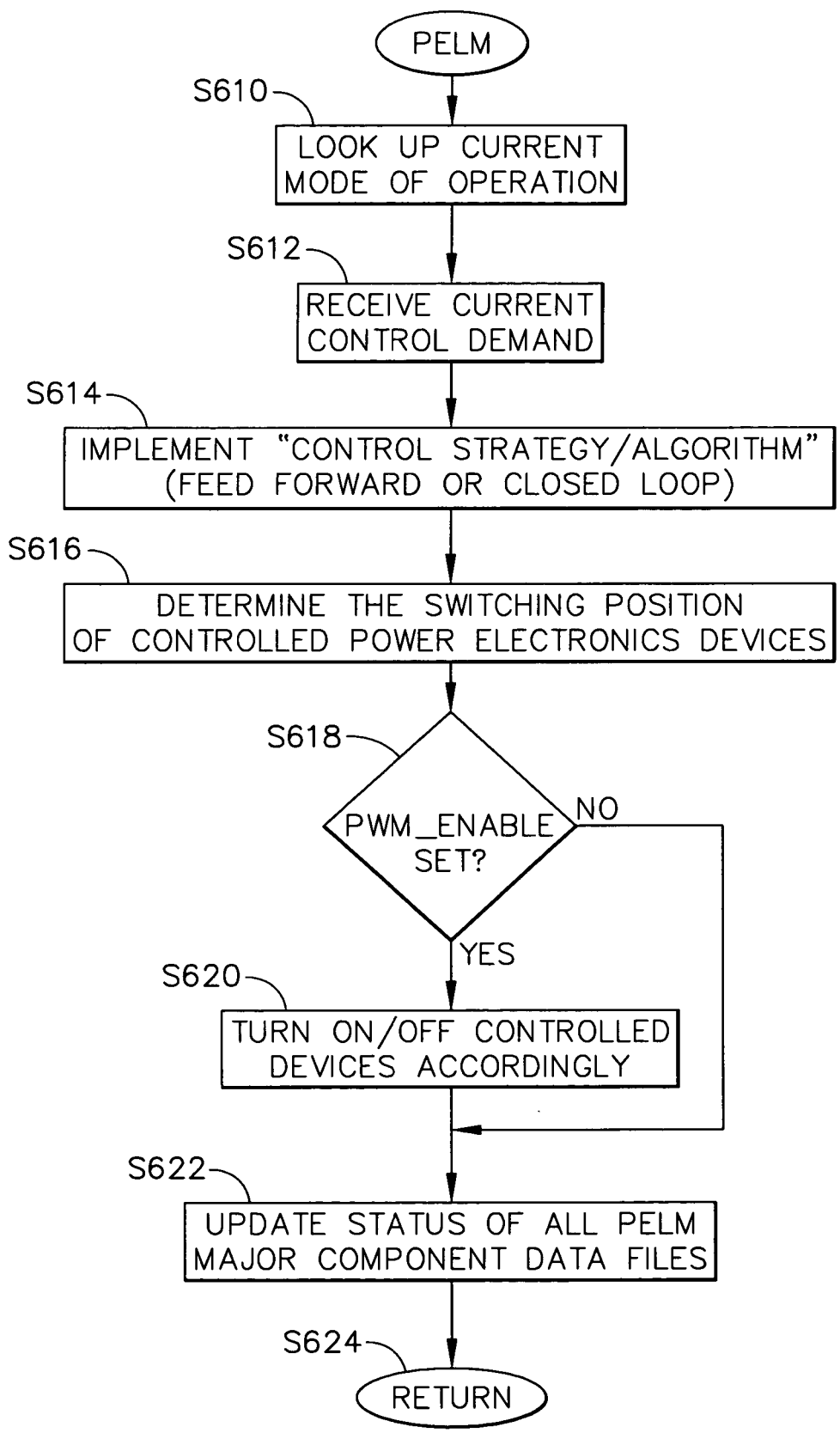
FIG. 6 is a flow diagram illustrating operations performed by the power electronics load manager of the system illustrated in FIG. 1 in accordance with an embodiment of the present invention.

FIG. 6 is a flow diagram illustrating general operations of the PELM unit 90 in accordance with an embodiment of the present invention (i.e., the PELM sub-routine S228 in FIG. 2). Since details of power conversion and distribution are known in the art, described in the above-cited co-pending application, and not the focus of the present application, the flow diagram of FIG. 6 is general/high-level in nature. Initially, the PELM unit 90 determines the present mode of operation (S610) and receives an indication of control demand set-points either directly from the operator interface 84 or the higher level PHM and control unit 86 or from synthesized data of the DMU 10 (S612). Next, the PELM unit 90 receives a control strategy/algorithm from the DMC 20 (S614) and implements the switching position of controlled power electronic devices (S616) if the corresponding PWM-ENABLE is HIGH (S618). If the corresponding PWM_EMABLE is LOW, the PELM unit 90 updates the status of all PELM major component data files (S622). If the PWM_ENABLE signal is set HIGH, the PELM unit 90 performs on/off control of associated power electronic devices accordingly (S620). This completes the PELM sub-routine, and operation returns to S230 of FIG. 2 (S624).

Figure 7A:
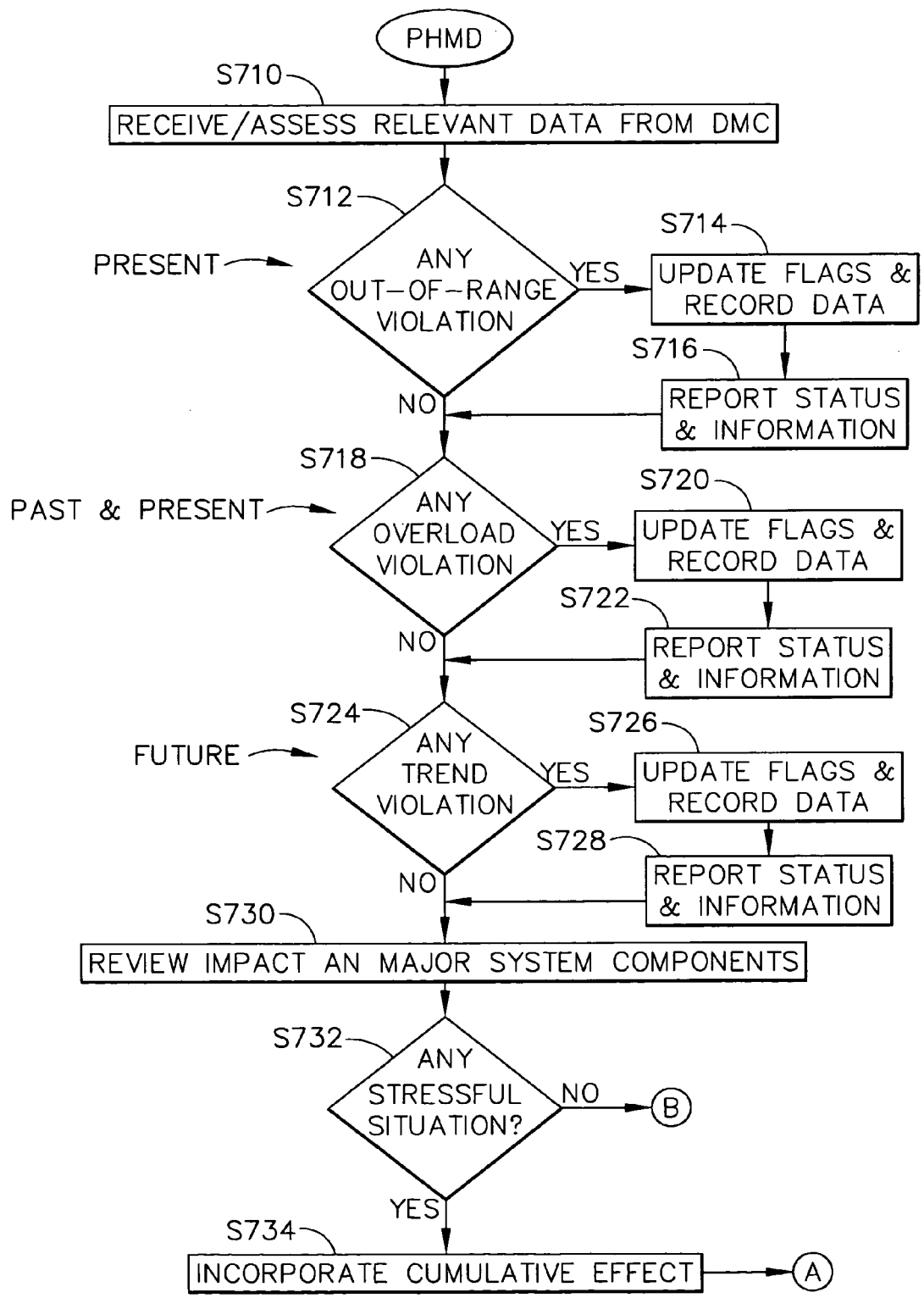
FIGS. 7A-7B illustrate operations performed by the prognostics health monitoring and diagnostic unit of the system illustrated in FIG. 1 according to an embodiment of the present invention.
Figure 7B:
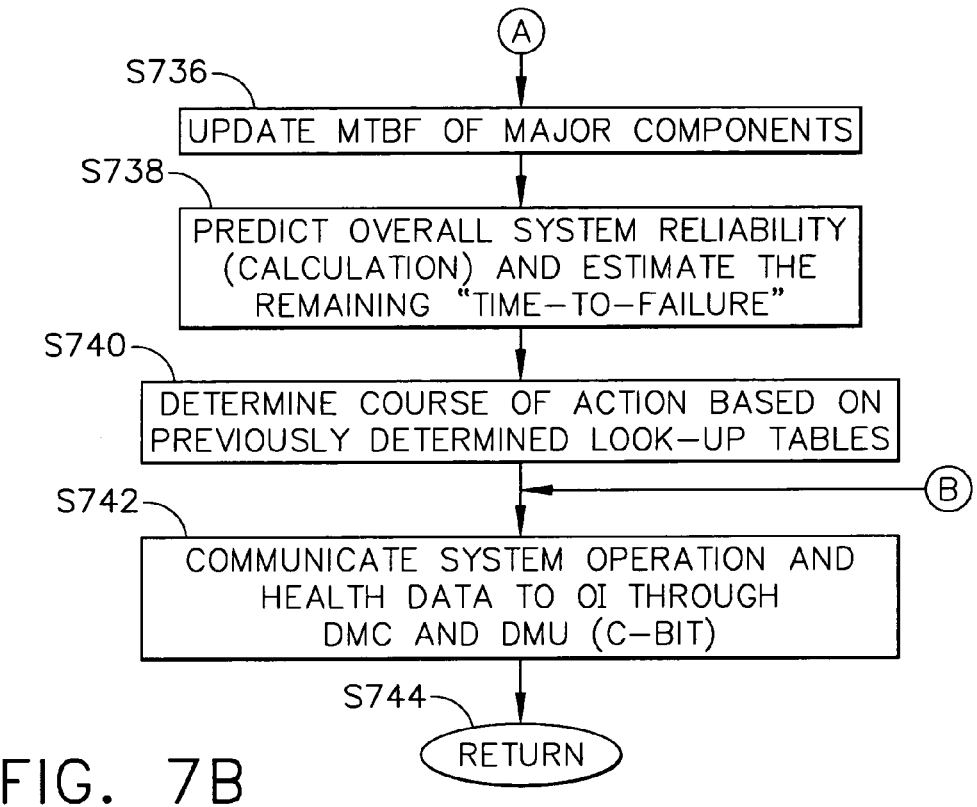

FIGS. 7A and 7B illustrate operations performed for the PHMD unit 30 in accordance with an embodiment of the present invention (i.e., the PHMD sub-routine S230 in FIG. 2). Initially, the PHMD unit 30 receives and assesses all relevant data from the DMC 20, including synthesized and major component/system data from the DMU 10 and measurement value data (S710). The PHMD unit 30 determines whether there are any out-of-range violations (S712) and, if yes, updates flags and records data (S714) and reports status information (S716). Next, the PHMD unit 30 determines whether any overload violation has occurred based on past and present data (S718). For example, rms system voltage and current, under/over frequency, power overload, power factor, rate of rise and fall of critical system parameters (di/dt or dv/dt, etc.), Total Harmonic Distortion (THD), individual harmonic components of the system voltages and currents, degree of system unbalance and variation in the systems symmetrical components (positive, negative and zero sequence components), system efficiency and its variation over-time for the same operational modes, degree of meeting system regulation objectives, etc. If yes, the PHMD unit 30 updates flags and records data (S720) and reports status information (S722).

Next, the PHMD unit 30 determines whether any trend violation has occurred (S724). For example, as described below, the PHMD unit 30 may predict unsafe operation condition by trending the past and present data, predict estimated MTBF for individual components and estimate the overall reliability of the system, achieve fail-safe operation for mission critical systems by suggesting preventive and/or corrective actions by synthesizing all the data available in the Data Management Unit (DMU), prepare prognostic reports and highlight stressful operation conditions caused either by the deficiencies of the existing design or deviations from the component data-sheets to be reviewed by design engineers and discussed with supplier of such components. With reference to FIGS. 7A-7B, if a trend violation is identified, the PHMD unit 30 updates flags and records data (S726) and reports status and relevant information (S728). As a result of the determination of whether there are any out-of-range violations, overload violations, or trend violations, the PHMD unit 30 assesses the impact on major system components (S730). This may be done based on major component/system data accessed from the DMU 10. The PHMD unit 30 determines whether any stressful situation has been indicated (S732) and, if yes, assesses the cumulative effect of the stressful situation on the associated component/sub-system/system (S734) and updates the estimated MTBF of major components (S736 in FIG. 7B). If no stressful situation has occurred, the PHMD unit 30 communicates system operation and health data to the operator interface 84 via the DMC 20 and the DMU 10 (S742). If a stressful situation has occurred, and after updating the MTBF of major components, the PHMD unit 30 predicts overall system reliability and estimates the remaining time to failure (S738). Next, the PHMD unit 30 determines whether any course of action, such as user intervention, is necessary, e.g., based on previously determined look-up tables (S740), and communicates system operation health data to the operator interface 84 via the DMC 20 and the DMU 10 (S742). This completes the PHMD sub-routine, and operation returns to S220 of FIG. 2 (S744).

Figure 8:
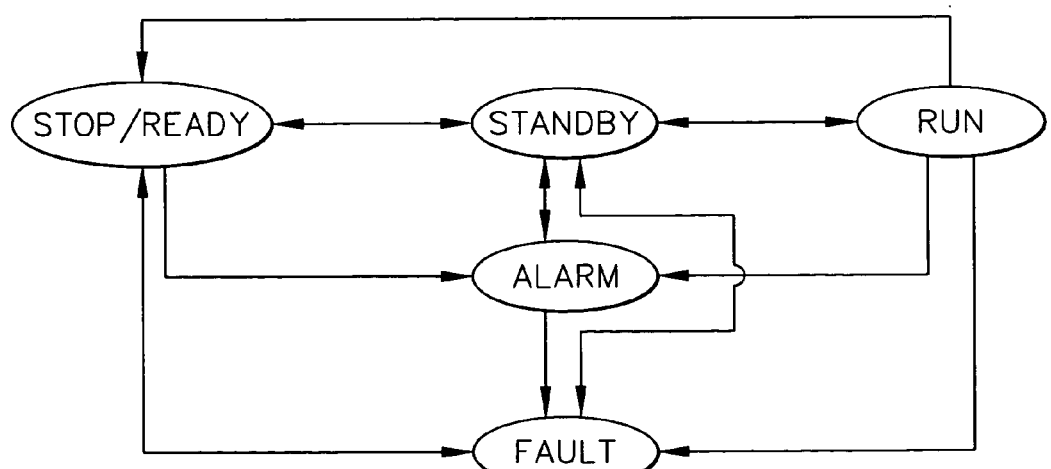
FIG. 8 illustrates transitions among different operating modes of the system illustrated in FIG. 1 according to an embodiment of the present invention.

As evident from the above-description, an embodiment of the present invention relies on at least five distinct modes of operation for proper control sequencing, diagnostics, and prognostics health monitoring of digital power conversion and distribution equipment. FIG. 8 illustrates the allowed (i.e., fail-safe) transitions among these distinct modes of operation. Furthermore, table 1 below shows an exemplary "table," describing operation of a power conversion system under each mode of operation for the exemplary power conversion environment described above. It should be recognized that this table describes "logic variables" for a variable frequency power conversion and distribution system of the type described in the above-cited co-pending application, titled "SYNCHRONOUS AND BI-DIRECTIONAL VARIABLE FREQUENCY POWER CONVERSION SYSTEMS," but the number of internal/external logic variables can be expanded and their T/F/X status changed as required to meet the specific requirements of PHMD of other applications.

TABLE 1

| Mode | Logic Power OK? | Input Power OK? | Enable | PWM_Enable | Any Fault? | Any Alarm? | CB_ON | SS_ON |
| --- | --- | --- | --- | --- | --- | --- | --- | --- |
| STOP/READY | T | F | F | F | F | F | F | F |
| RUN | T | T | T | T | F | X | T | T |
| ALARM | T | T | T | T | F | T | T | T |
| FAULT | X | X | X | X | T | X | X | X |
| STANDBY | T | X | F | F | X | X | X | X |

Legend:
T = TRUE,
F = FALSE,
X = DON'T CARE

It should be realized that the logic variable values of Table 1 are for the nominal case, and that, during the start-up test (S-BIT) phase of operation (i.e., S212 of FIG. 2), logic variable values for certain modes of operation will be different that those in Table 1. For example, during S-BIT, a FAULT or ALARM condition may be identified before Enable or input power is "T."

In addition to relying on Soft-start and Soft-stop operations to protect power electronics, the present invention also provides enhanced ride-through capability for voltage sag conditions. Ride-through, which may be considered a sub-mode of the RUN mode, is the ability of a conditioned power system to continue to operate in a fail-safe fashion without tripping or the need for a cold-start or system reset in the face of a power interrupt. Two types of ride-through are identified in the present application:

1. Interruption of the main logic power supply input voltage (e.g., 28VDC). In this case, a back-up logic power supply may be realized from a DC-DC converter powered from the DC-link of the power conversion equipment. Alternatively, an auxiliary AC-DC converter powered from another AC-system source can be used to generate a back-up logic power supply. These back-up power supplies may be DIODE-ORed to realize a fail-safe logic power supply. Therefore, even if the main power input which provides power to the logic power supply is interrupted, the system diagnostics and control can continue its operation without any interruption.

2. Interruption of the main input power (e.g., AC system voltage). In this case, in the face of a momentary power interruption, the ride-through capability allows the power conversion system to properly resume operation without any significant electrical transients or time-delay (a need for waiting for speed to ramp-down to zero), usually referred to as a "cold-start." In a traditional power conversion equipment/motor controller system, when there is a momentary power interruption, protective functions at best detect a problem with the power system and shut down the system. The motor/load cannot be re-energized immediately after the power is restored due to significant problems arising from the speed of the electromechanical load and synchronization problems which usually arise due to back emf of other types of active loads. In the case of motor controls, a cold-start is required which introduces time delays before speed can be restored to pre-fault conditions. In certain applications these time delays and nuisance trips cannot be tolerated. The operation of the ride-through controls are described below:

The DC link of the power conversion system is monitored and if it goes below a certain pre-determined level, the PWM_ENABLE signal is disabled. The energy stored in the DC link is still utilized for delivering power to the load and the inverter gating signals are still enabled. Even though an input system under-voltage condition is detected, the power electronics system is allowed to restart if the system power is restored back to normal conditions. This prevents any unnecessary cold-start or initialization of the controlled environment. Two levels of DC link voltage are used for enabling the ride-through controls: one for HIGH ENOUGH DC link voltage and one for TOO LOW a DC link. In the first case, this is the minimum DC link voltage that is required to deliver power to load without entering an overload condition. In the second case, the DC link voltage has fallen below a level which requires a fresh Soft-start and this condition is captured and memorized through the use of SS_ON control signal which is asserted LOW. Transition between these different DC link voltages may be controlled by two software-based independent hysteresis control loops and this prevents chattering of the associated ride-through controls around a predetermined HIGH ENOUGH or TOO LOW set points for the DC link.

Figure 9A:
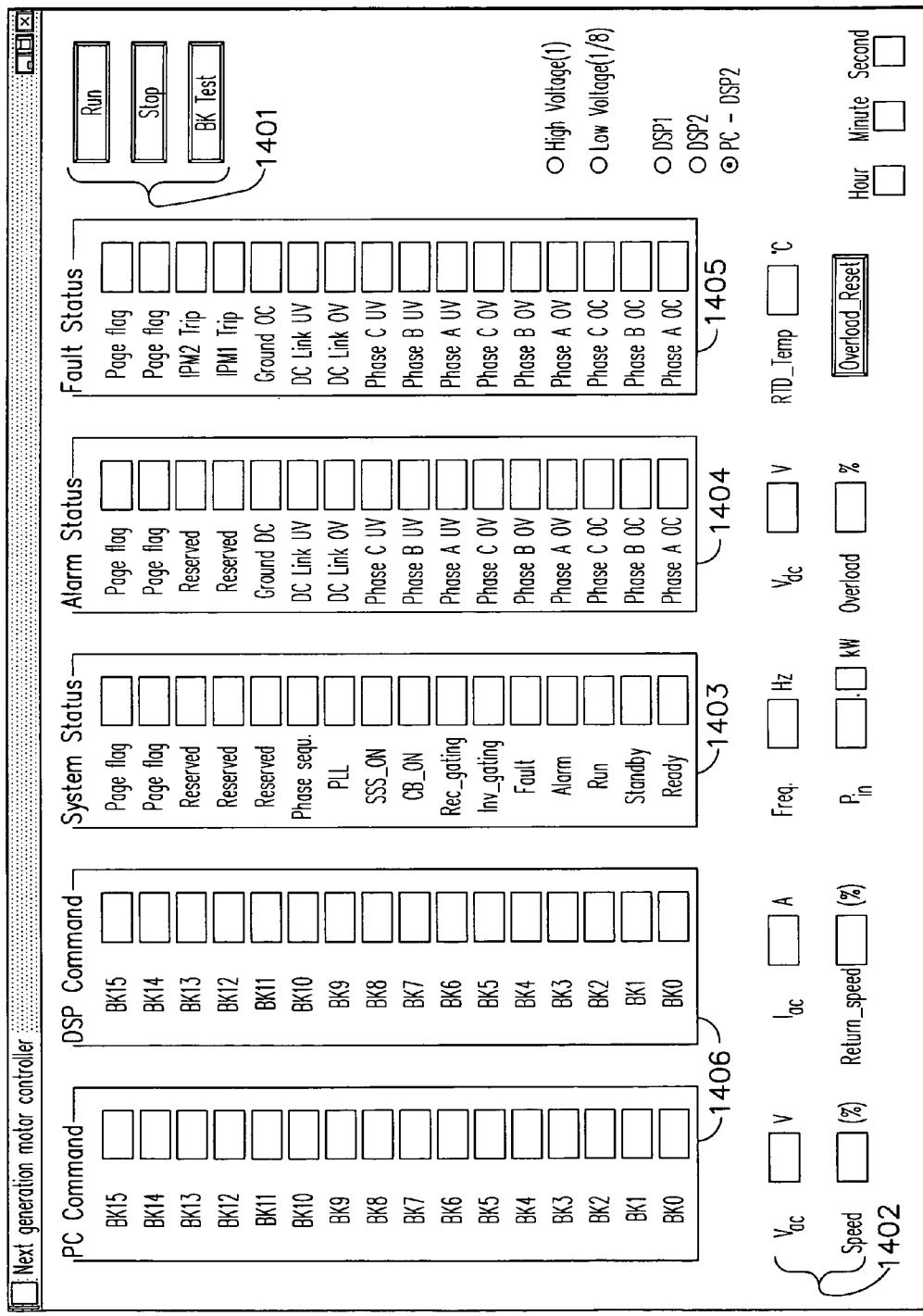
FIG. 9A illustrates an exemplary operator interface screen for inputting operation commands and monitoring system operation according to an embodiment of the present invention.

FIG. 9A illustrates an example of an operator interface 84 according to an embodiment of the invention. The control, status, fault and alarm information has been functionally grouped as illustrated. Group 1401 illustrates control buttons. Group 1402 illustrates system parameters. Group 1403 illustrates system status indicators. Group 1404 illustrates alarm status indicators. Group 1405 illustrates fault status indicators and group 1406 illustrates communication bit displays. Those skilled in the art will recognize that all the signals illustrated are not required nor is the invention limited to the signals illustrated. Signals can be added or removed as desired.

Figure 9B:
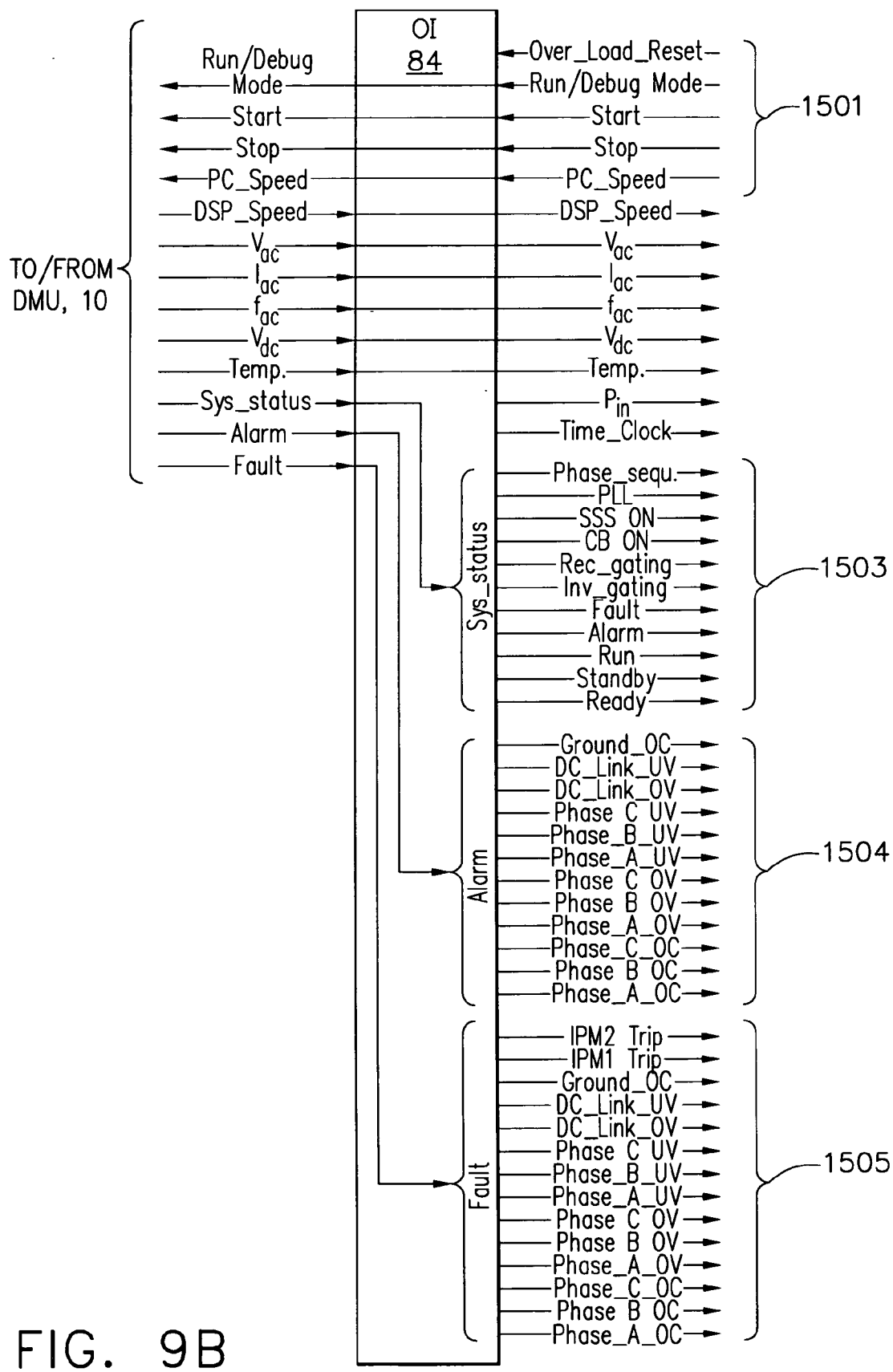
FIG. 9B illustrates exemplary commands/data exchanged between the operator interface and the data management unit of the system illustrated in FIG. 1 in accordance with an embodiment of the present invention.

FIG. 9B illustrates an example of a typical operator interface for debugging and commands/data exchanged between the operator interface 84 and the outside command/data unit 12 of the DMU 10. As shown in FIG. 9B, the operator interface 84 receives systems status data 1503, alarm data 1504, e.g., indicating various over-current, over-voltage, under-voltage situations, and fault data 1505. Furthermore, the operator interface 84 receives data relating to critical system parameters, such as $V_{ac}$, $I_{ac}$, etc. To provide commands to the DMC 20 via the DMU 10, the operator interface 84 receives control commands 1501, e.g., indicating a start command, stop command, etc.

The specific commands/data identified in FIG. 9B are provided merely for illustration and will change depending on the specific application.

What is claimed is:

1. An apparatus for control sequencing and prognostic health monitoring of an electrical power system of a vehicle, the electrical power system including power rectification/inversion equipment for AC-DC, DC-AC, and/or AC-DC-AC power conversion and power distribution equipment for distributing converted power to one or more loads of the vehicle, said apparatus comprising:

a data measuring unit for obtaining measurement values of at least one electrical component of the electrical power system;

a prognostic health monitoring and diagnostic unit for identifying out-of-range conditions for said electrical component as a function of said measured values, said prognostic health monitoring and diagnostic unit further identifying overload conditions for said electrical component based on past and present measurement values and identifying trend violations as a function of said measurement values to assess future operation of said electrical component; and a decision making unit for controlling transition between a plurality of operating modes based on conditions identified by said prognostic health monitoring and diagnostic unit, said decision making unit controlling the transition between said plurality of operating modes to selectively continue operation of said electronics power system of said vehicle in a fail-safe fashion despite conditions identified by said prognostic health monitoring and diagnostic unit and to selectively initiate autonomous restart of said power rectification/inversion equipment following a fault condition identified by said prognostic health monitoring and diagnostic unit.

2. The apparatus according to claim 1, wherein said plurality of operating modes include:

a STOP/READY mode, during which a start-up test sequence is initiated by said decision making unit to confirm overall readiness of said power system;

a transitional STANDBY mode;

a RUN mode, during which said power system is operational; and a FAULT mode, which is initiated by said decision making unit when said prognostic health monitoring and diagnostic unit identifies an abnormal event.

3. The apparatus according to claim 2, wherein said plurality of operating modes further include:

an ALARM mode, which said decision making unit initiates when said prognostic health monitoring and diagnostic unit detects a condition for said electrical component that is at or near a tolerance level of said electrical component.

4. The apparatus according to claim 3, wherein said decision making unit initiates transition from said STANDBY mode to said RUN mode, said FAULT mode, or said ALARM mode.

5. The apparatus according to claim 3, wherein said decision making unit selectively initiates transition from said STOP/READY mode to said STANDBY mode, said FAULT mode, or said ALARM mode.

6. The apparatus according to claim 3, wherein said decision making unit selectively controls transition from said RUN mode to said ALARM mode, said FAULT mode, said STANDBY mode, or said STOP/READY mode.

7. The apparatus according to claim 3, wherein said decision making unit selectively initiates transition from said FAULT mode to said STANDBY mode or said STOP/READY mode.

8. The apparatus according to claim 1, wherein said decision making unit executes a power sequencing routine to selectively enable Soft-start, Soft-stop, restart, and ride-through for said power system based on results of said prognostic health monitoring and diagnostic unit.

9. The apparatus according to claim 1, further comprising:
a data management unit for synthesizing data obtained from said data measuring unit and for storing operational threshold values for said electrical component.

10. The apparatus according to claim 9, wherein said data management unit further stores historical data, including results of said prognostic health monitoring and diagnostic unit, and functions as an interface between said decision making unit and an operator interface and/or a higher level control unit.

11. The apparatus according to claim 9, wherein said decision making unit updates reliability data for said component stored in said data management unit in accordance with conditions identified by said prognostic health monitoring and diagnostic unit.

12. The apparatus according to claim 1, further comprising:
a protection unit, which receives measurement values from said data measuring unit and selectively initiates protective action for said electrical component based on said measurement values.

13. The apparatus according to claim 1, wherein said decision making unit determines the cumulative effect of conditions identified by said prognostic health monitoring and diagnostic unit to estimate the remaining time before failure for said component.

14. A method for control sequencing and prognostic health monitoring of an electrical power system of a vehicle, the electrical power system including power rectification/inversion equipment for AC-DC, DC-AC, and/or AC-DC-AC power conversion and power distribution equipment for distributing converted power to one or more loads of the vehicle, said method comprising:
obtaining measurement values of at least one component of the electrical power system;
performing prognostic health monitoring and diagnostics to identify out-of-range conditions for said electrical component as a function of said measured values, overload conditions for said electrical component based on past and present measurement values, and trend violations as a function of said measurement values to assess future operation of said electrical component; and
controlling transition between a plurality of operating modes based on conditions identified by said step of performing prognostic health monitoring and diagnostics, said controlling step controlling the transition between said plurality of operating modes to selectively continue operation of said electronics power system of said vehicle in a fail-safe fashion despite conditions identified by said prognostic health monitoring and diagnostic unit and to selectively initiate autonomous restart of said power rectification/inversion equipment following a fault condition identified by said step of performing prognostic health monitoring and diagnostics.

15. The method according to claim 14, wherein said plurality of operating modes include:
a STOP/READY mode, during which a start-up test sequence is initiated to confirm overall readiness of said power system;
a transitional STANDBY mode;
a RUN mode, during which said power system is operational; and
a FAULT mode, which is initiated when said step of performing prognostic health monitoring and diagnostics identifies an abnormal event.

16. The method according to claim 15, wherein said plurality of operating modes further include:
an ALARM mode, which is initiated when said step of performing prognostic health monitoring and diagnostics detects a condition for said electrical component that is at or near a tolerance level of said electrical component.

17. The method according to claim 16, wherein said step of controlling initiates transition from said STANDBY mode to said RUN mode, said FAULT mode, or said ALARM mode.

18. The method according to claim 16, wherein said step of controlling selectively initiates transition from said STOP/READY mode to said STANDBY mode, said FAULT mode, or said ALARM mode.

19. The method according to claim 16, wherein said step of controlling selectively controls transition from said RUN mode to said ALARM mode, said FAULT mode, said STANDBY mode, or said STOP/READY mode.

20. The method according to claim 16, wherein said step of controlling selectively initiates transition from said FAULT mode to said STANDBY mode or said STOP/READY mode.

21. The method according to claim 14, wherein said step of controlling executes a power sequencing routine to selectively enable Soft-start, Soft-stop, restart, and ride-through for said power system based on results of said step of performing prognostic health monitoring and diagnostics.

22. The method according to claim 14, further comprising:
synthesizing data obtained from said data measuring unit; and storing operational threshold values for said electrical component.

23. The method according to claim 22, further comprising:
storing historical data, including results of said step of performing prognostic health monitoring and diagnostics.

24. The method according to claim 22, further comprising:
updating reliability data for said component in accordance with conditions identified by said step of performing prognostic health monitoring and diagnostic unit.

25. The method according to claim 14, further comprising:
 selectively initiating protective action for said electrical component based on said measurement values.

26. The method according to claim 14, further comprising:
 determining the cumulative effect of conditions identified by said step of performing prognostic health monitoring and diagnostics to estimate the remaining time before failure for said component.

* * * * *